US00RE40236E

(19) United States
(12) Reissued Patent
Johnson et al.

(10) Patent Number: US RE40,236 E
(45) Date of Reissued Patent: Apr. 8, 2008

(54) SOFTWARE-BASED VOLTAGE DETECTION TO RESERVE DEVICE POWER UPON SHUTDOWN

(75) Inventors: Scott R. Johnson, Sunnyvale, CA (US); Francis J. Canova, Fremont, CA (US); Eric M. Lunsford, San Carlos, CA (US); Nicholas Twyman, San Francisco, CA (US); Neal A. Osborne, Milpitas, CA (US)

(73) Assignee: Palm, Inc., Sunnyvale, CA (US)

(21) Appl. No.: 11/140,526

(22) Filed: May 27, 2005

Related U.S. Patent Documents

Reissue of:
(64) Patent No.: 6,571,343
Issued: May 27, 2003
Appl. No.: 09/505,446
Filed: Feb. 16, 2000

U.S. Applications:
(63) Continuation-in-part of application No. 09/321,686, filed on May 28, 1999, now Pat. No. 6,425,087.

(51) Int. Cl.
*G06F 1/28* (2006.01)

(52) U.S. Cl. ..... 713/340; 714/22
(58) Field of Classification Search ..... None
See application file for complete search history.

(56) References Cited

U.S. PATENT DOCUMENTS 3,744,034 A * 7/1973 Paul ..... 711/164
4,860,372 A * 8/1989 Kuzunuki et al. ..... 382/189

(Continued)

FOREIGN PATENT DOCUMENTS

EP 0 560 510 A1 * 9/1993
EP 0 560 510 * 9/1993

OTHER PUBLICATIONS

"Method for Warning Users of a Low Battery Condition on a Battery–Powered Computer", IBM Technical Disclosure Bulletin, vol. 29, No. 6, Nov. 1986, pp. 2461–2463.*
Katsumi, O., "Battery Exchange Informing Device for Electronic Equipment", Patent Abstracts of Japan (JP 04279918), vol. 17, No. 76, Feb. 16, 1993.*
Minoru, M., "Electronic Appliance", Patent Abstracts of Japan, (JP 61246821), vol. 11, No. 93, Mar. 24, 1987.*
Yuichi, I., "Power Control Circuit For Battery Operation Device", Patent Abstracts of Japan (JP 06059785), vol. 18, No. 298, Jun. 7, 1994.*
Yukichi, N., "Electronic Equipment", Patent Abstracts of Japan (JP 04307613), vol. 17, No. 127, Mar. 17, 1993.*
Yoshihiro, Y., "Copying Machine", Patent Abstracts of Japan (JP 05297659), vol. 18, No. 96, Feb. 16, 1994.*

(Continued)

*Primary Examiner*—Glenn A. Auve
(74) *Attorney, Agent, or Firm*—Kacvinsky LLC

(57) ABSTRACT

Methods and apparatus are provided for reserving power in a handheld computer by inducing a sleep mode when the energy supply of the handheld computer reaches a predetermined low level. A software is provided which operates a sleep mode when a device of the handheld computer detects a predetermined low battery voltage. A processor operates the software to place the handheld computer in a low energy-consuming shutdown state in which an interrupt controller operates to mask those interrupt signals thus providing an user with the impression that the device has entered an unresponsive sleep mode. In maintaining the sleep mode, the processor operates such that all input signals that request the handheld computer to power up remain active but so long as the battery voltage remains below a predetermined voltage the interrupt signals to power up selected applications and devices are masked. A method for returning the handheld computer to its normal operational mode once the energy supply has been replenished, is also provided.

40 Claims, 4 Drawing Sheets

U.S. PATENT DOCUMENTS

| | | | | | |
|---|---|---|---|---|---|
| 4,972,496 | A | * | 11/1990 | Sklarew | 382/187 |
| 5,231,381 | A | * | 7/1993 | Duwaer | 345/174 |
| 5,305,394 | A | * | 4/1994 | Tanaka | 382/189 |
| 5,389,745 | A | * | 2/1995 | Sakamoto | 178/18.03 |
| 5,434,929 | A | * | 7/1995 | Beernink et al. | 382/187 |
| 5,442,794 | A | * | 8/1995 | Wisor et al. | 713/340 |
| 5,444,192 | A | * | 8/1995 | Shetye et al. | 178/18.09 |
| 5,452,371 | A | * | 9/1995 | Bozinovic et al. | 382/187 |
| 5,515,303 | A | * | 5/1996 | Cargin et al. | 361/683 |
| 5,528,743 | A | * | 6/1996 | Tou et al. | 715/541 |
| 5,534,892 | A | * | 7/1996 | Tagawa | 345/173 |
| 5,615,284 | A | * | 3/1997 | Rhyne et al. | 382/187 |
| 5,621,817 | A | * | 4/1997 | Bozinovic et al. | 382/189 |
| 5,630,148 | A | * | 5/1997 | Norris | 713/322 |
| 5,698,822 | A | * | 12/1997 | Haneda et al. | 178/18.01 |
| 5,841,901 | A | * | 11/1998 | Arai et al. | 382/187 |
| 5,915,002 | A | * | 6/1999 | Shimosako | 379/93.07 |
| 5,926,394 | A | * | 7/1999 | Nguyen et al. | 716/1 |
| 5,978,921 | A | * | 11/1999 | Ryu | 713/300 |
| 6,112,249 | A | * | 8/2000 | Bader et al. | 709/239 |
| 6,131,166 | A | * | 10/2000 | Wong-Insley | 713/300 |
| 6,266,776 | B1 | * | 7/2001 | Sakai | 713/300 |
| 6,425,087 | B1 | * | 7/2002 | Osborn et al. | 713/340 |

OTHER PUBLICATIONS

Katsuyoshi, K., "Battery Life Monitoring Device", Patent Abstracts of Japan (JP 08220199), vol. 1996, No. 12, Dec. 26, 1996.*

Gray, R. et al., "Efficient MC68HC08 programming: reducing cycle count and improving code density", Dr. Dobb's Journal, vol. 20, No. 5, May 1995, pp. 70–75.*

Ruley, J. et al., "Handheld–to–Handheld Combat", Windows Magazine, No. 811, p. 55, Nov. 1997.*

Dayton, D., "FRx extends reporting power of Platinum Series", PC Week, vol. 8, No. 5, p. 29(2), Feb. 1991.*

Forbes, J. et al., "Palm PCs get a Big Hand (What's Hot)", Windows Magazine, No. 905, p. 96, May 1998.*

Penwarden, M., "More Muscle for HP's OmniBook", Windows Magazine, No. 501, p. 110, Jan. 1994.*

Feigel, C., "IBM, Motorola preview embedded PowerPCs; 403 and 505 □□processors combine strong performance with low cost", Microprocessor Report, vol. 8, No. 6 , pp. 1–5, May 1994.*

Bursky, D., "Evolving DSP chips do more", Electronic Design, vol. 38, No. 23, pp. 51–59, Dec. 1990.*

* cited by examiner

SOFTWARE-BASED VOLTAGE DETECTION TO RESERVE DEVICE POWER UPON SHUTDOWN

Matter enclosed in heavy brackets [ ] appears in the original patent but forms no part of this reissue specification; matter printed in italics indicates the additions made by reissue.

REFERENCE TO RELATED APPLICATIONS

This application is a continuation in-part of application Ser. No. 09/321,686, now U.S. Pat. No. 6,425,087 entitled "Method and Apparatus for Using Residual Energy in a Battery-Powered Computer," filed May 28, 1999, and naming Neal A. Osborne, Francis James Canova, Jr., Nicholas M. Twyman, Scott R. Johnson and Steven C. Lemke as inventors. This application incorporates application Ser. No. 09/321,686 by reference.

BACKGROUND OF THE INVENTION

1. Field of the Invention

The invention relates generally to the field of handheld computers. More particularly, the invention relates to providing a battery power management software for a handheld computer.

2. Description of the Related Art

Most commercial, handheld computers have a built-in battery system. In addition to the battery provided, most handheld computers also have a battery adapter that serves as a battery recharger. The expected usage of a handheld computer is that the operator will use it several times a week, for periods of several minutes at a time. The computer will drain the battery at a moderate rate when the computer is running, and at the self-discharge rate when the computer is shut off. Quite often, the user will use the computer until the "low battery" alarm sounds. At this point, the battery may be drained of 90% of its useful capacity before the user recharges it.

Conventional battery-powered handheld computers provide a single warning message before the primary battery discharges to a cutoff voltage. At the cutoff voltage, the battery-powered computer can no longer be powered by the primary battery and a lockout of applications may occur. The operating voltage of the primary battery discharging below a certain predetermined warning voltage typically triggers the single warning message. Such operating voltage based warning messages can be unsatisfactory due to accuracy limitations of the voltage detection component(s) used to monitor the operating voltage, the warning message is provided too late for the user.

Some conventional battery-powered computers rely on an alternative energy source to ensure retention of data when the energy level of the primary energy source goes below a minimum energy level. These alternative energy sources can include small batteries such as watch batteries, large capacitors, and other energy storage devices. The capacity requirements for the alternative energy sources are typically much lower than the primary energy source capacity. The alternative energy source provides a voltage source when the batteries are replaced. For example, in the Palm III™ handheld computer from Palm Computing, Santa Clara, Calif., a capacitor is charged by the primary energy source (two AAA sized alkaline batteries). The capacitor provides an alternative energy capacity that enables the Palm III™ to retain data for approximately one minute to three minutes without charge from the alkaline batteries, e.g., when the user is replacing the alkaline batteries.

Some prior art devices use secondary or alternate batteries, such as watch batteries. In these devices, the remaining capacity of the alternate battery must be monitored to avoid unpredictable. Monitoring the remaining capacity of the alternate battery is duplicative of any provision to monitor the capacity of the primary battery itself.

Some handheld computers provide a warning that the main battery needs to be recharged and then locks out the hardware of the computer. The charge remaining on the main battery is then used as a capacitor to retain the data in the memory. Typically, the user has 1–2 days to recharge the battery on the computer to avoid loss of stored data.

SUMMARY OF THE INVENTION

The following description and claims relate to a software program which provides additional time for an user to replenish an energy source of a handheld computer after the energy source has discharged to predetermined low level. A method for implementing the software program by interrupting the activation of peripherals in response to a power "on" signal, thereby inducing the handheld computer to "play dead," is provided.

When the energy supply source has discharged to a low level, and prior to implementing a hardware lockout, the software program operates to induce the handheld computer to respond to signals for powering up the device by interrupting the flow of activation signals for certain devices and applications, thereby providing the user with the impression that handheld computer is apparently in a shutdown mode. An apparatus for operating the software interrupt in a handheld computer is also provided.

These, and other, goals and aspects of the invention will be better appreciated and understood when considered in conjunction with the following description and drawings.

BRIEF DESCRIPTION OF THE FIGURES

Various embodiments of the invention are illustrated in the drawings accompanying and forming a part of this specification, wherein like reference characters (if they occur in more than one view) designate the same parts. It should be noted that the features illustrated in the drawings are not necessarily drawn to scale.

DETAILED DESCRIPTION

A. Introduction

Handheld computers are often battery-powered. Warning messages and hardware lockouts are typically used to warn the user when the energy source nears depletion in order to afford the user an opportunity to replace or recharge the power source before the charge on the battery module gets so low that the handheld computer begins to lose data stored in its memory.

Hardware lockouts at very low energy levels usually occur a day or two before the battery module discharges to the unacceptably low level when the memory begins to lose stored data. A sleep mode initiated five to seven days prior to the hardware lockout provides a user with the impression that the handheld computer has shut down and adds several days to the time within which the user may replenish the energy source without losing valuable data from the handheld computer. During a sleep mode, the processor of a handheld computer remains active to receive input from the keyboard and other sources of signals for powering on the device. However, so long as the battery module charge remains below a sleep mode threshold, all interrupts to power on energy-consuming peripherals are masked and the user receives no feedback. Thus the user is given the impression that the battery module charge is so low that the handheld computer has apparently locked out and the battery module must be recharged and replaced.

Figure 1:
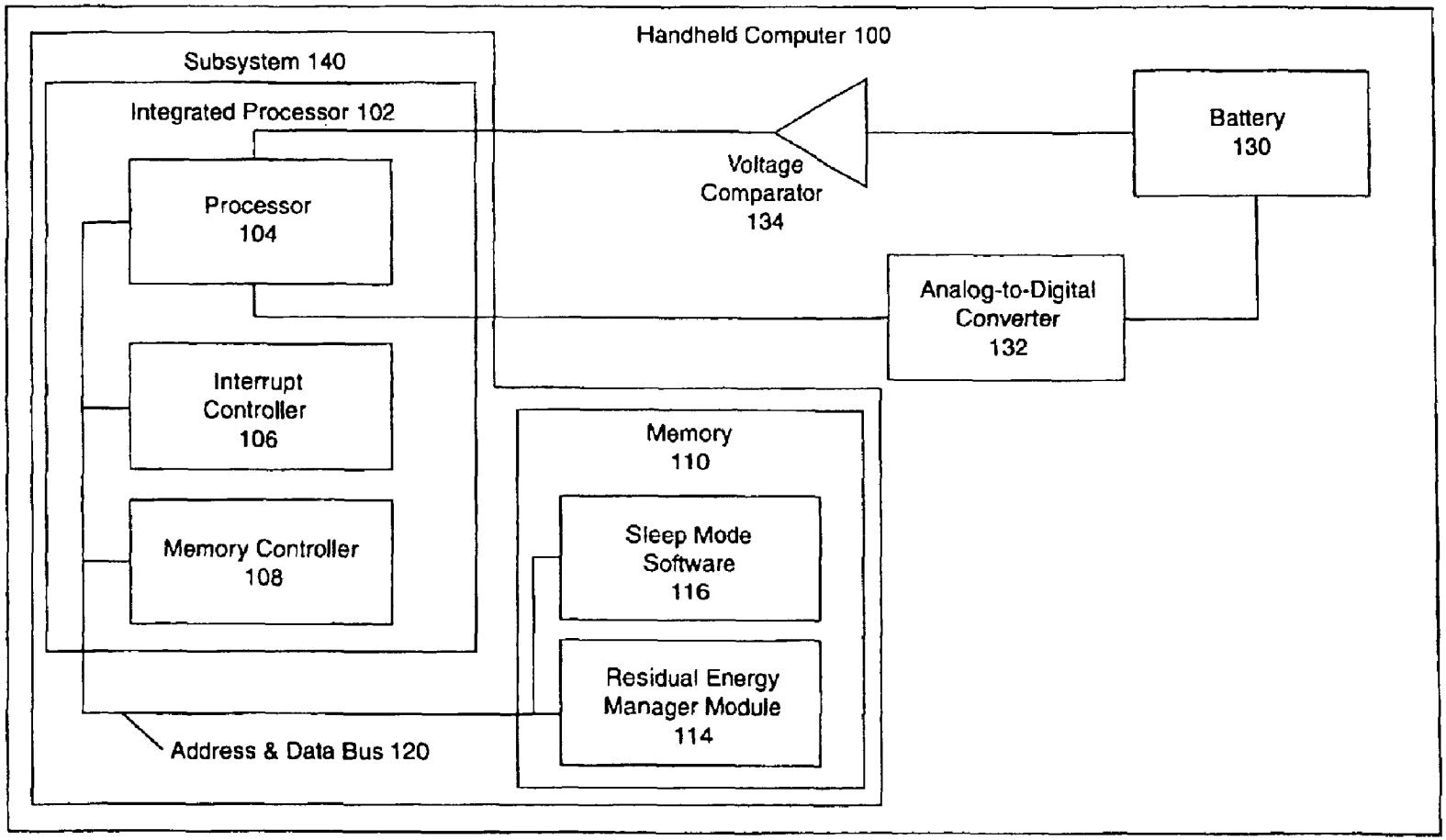
FIG. 1 is a block diagram of a handheld computer adapted to enter a software based shutdown state when the energy supply of the handheld computer reaches a predetermined low energy level.

A system for implementing a software-operated sleep mode in a handheld computer is illustrated in FIG. 1. The following description lists the elements of FIG. 1 and their corresponding interconnections and descriptions.

B. System

A handheld computer 100 including one embodiment of the invention is shown in FIG. 1. Embodiments of the invention may include PalmPilot™, Palm III™, Palm V™, or Palm VII™ connected organizers, manufactured by the Palm Computing of Santa Clara, Calif. Other embodiments of the invention can include handheld computers operating the Windows CE™ system, or other handheld computers and personal digital assistants. The following description lists the elements of FIG. 1, their corresponding interconnections and then describes the elements.

FIG. 1 illustrates a handheld computer 100. The handheld computer 100 includes an integrated processor 102, a memory 110, a battery module 130 and an analog to digital (A/D) converter 132. The integrated processor 102 includes a processor 104, an interrupt controller 106, and a memory controller 108. The memory 110 includes a sleep mode software 116 and a residual energy manager module 114. A subsystem 140 represents a logical grouping of elements including the memory 110 and the integrated processor 102 coupled by an address and data bus 120.

The address and data bus 120 couples the processor 104, the interrupt controller 106, the memory controller 108 and the sleep mode software 116 and the residual energy manager module 114. At least one rechargeable battery module 130 is accommodated within the handheld computer 100 in a series-connected state with the processor 104. The A/D converter 132 is coupled with the rechargeable battery module 130 and the processor 104 to monitor the battery voltage. The A/D converter 132 provides a digital signal corresponding to the operating voltage of the rechargeable battery module 130 to the processor 104 and the memory 110. In some embodiments, additional hardware resources include a voltage comparator 134, which provides a battery voltage reading to the processor 104.

The following describes the uses of the elements of FIG. 1. The integrated processor 102 is a computer processor that includes support components for a computer. In some embodiments, the DragonBall™ processor from Motorola Inc., Schaumburg, Ill., is used as the integrated processor 102. In other embodiments, the integrated processor 102 can be replaced with separate components to provide the functions of the integrated processor 102.

The integrated processor 102 has a common address and data bus 120 for internal communication between components and external communication with the memory 110. User applications and software are able to execute on the processor 104. The applications and software that run on the processor 104 include: operating systems, organizer programs, expense programs, to-do-list programs, scheduling programs, e-mail programs, synchronization programs, display processing programs, and other types of programs including the sleep mode software 116 and the residual energy manager module 114.

The memory controller 108 supports access to the memory 110. This may include mapping different banks within the memory 110 to specific addresses or simply changing the communications used on the address and data bus 120 to a suitable format for use in communicating with the memory 110.

The residual energy manager module 114 includes a program for detecting residual battery voltage and stores battery voltage and voltage difference data for the handheld computer 100. The residual energy manager module 114 can store values corresponding to at least one pre-determined action voltage level. The action voltage levels can correspond to actions such as: masking interrupt signals for activating applications in the handheld computer 100, or providing a warning to the user that the battery module 130 has discharged to a low operating voltage. The residual energy manager module 114 can compare the digital voltage signal provided by the A/D converter with the predetermined action voltage level to detect when the battery module 130 has discharged to approximately a predetermined action voltage level. If the battery module 130 has discharged to an operating voltage approximating an action voltage level, the residual energy manager module 114 can provide a signal for the processor 104 to cause the corresponding action to occur.

An interrupt controller 138 is disposed in the integrated processor 102. The interrupt controller 138 is coupled with the A/D converter 132 and sleep mode control software 116 disposed in the memory 110 and operates to mask interrupt signals that initiate certain high energy-consuming applications. This places the battery-powered handheld computer 100 in a low energy consumption "sleep" state when the battery module 130 has discharged to approximately a sleep mode voltage.

Programs stored in memory 110 may operate on the processor 104 and, responsive to information transmitted from the sleep mode software 116, the interrupt controller 106 can operate to mask interrupt signals for the activation of devices such as a display circuit (not shown) by the integrated processor 102. Controllers for the operation of circuits for devices may be disposed within the integrated processor 102.

C. Operation of Low Voltage Warning and Lockout System

Figure 2:
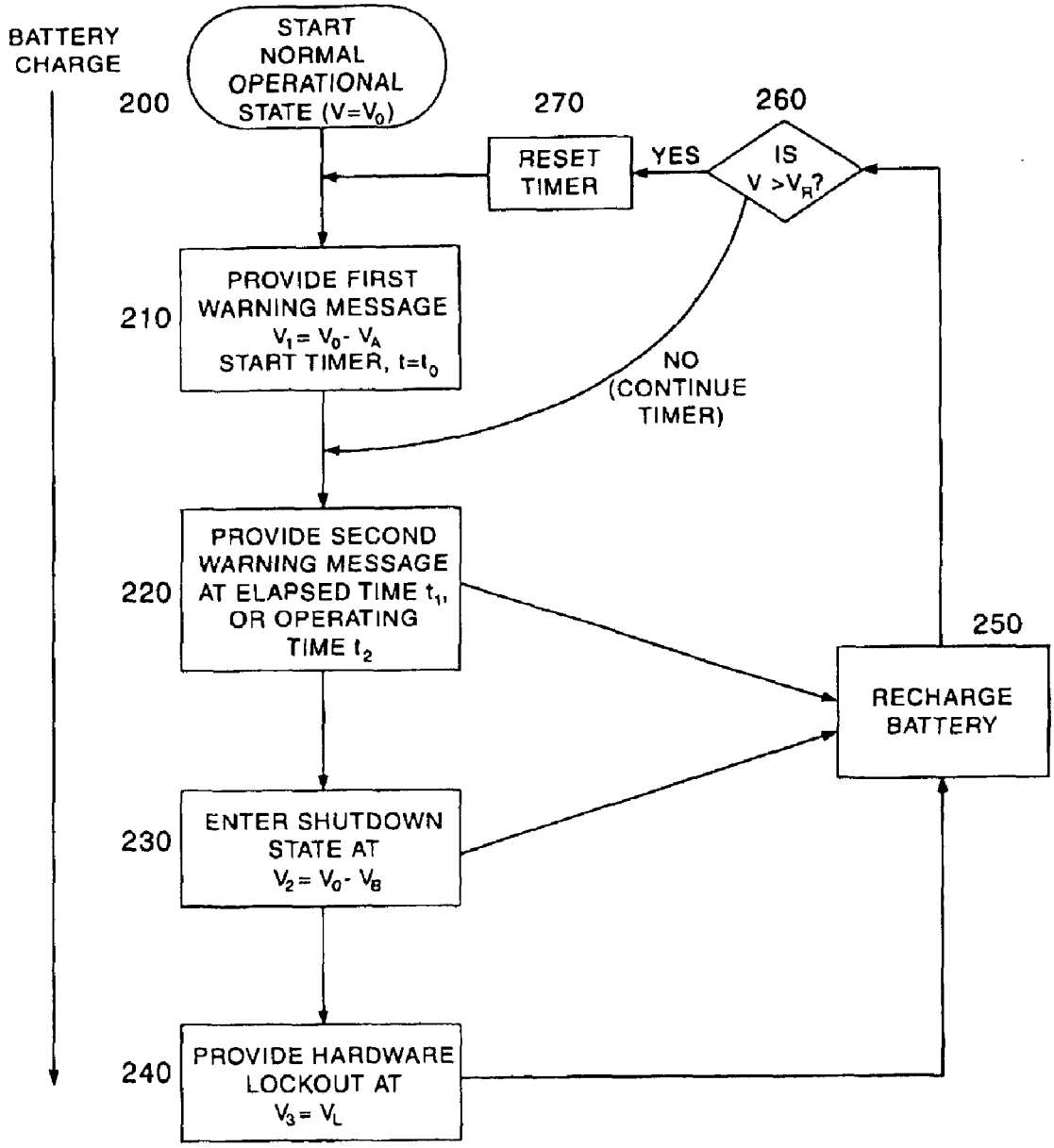
FIG. 2 is a control flow diagram for providing low battery power warnings and lockouts for a handheld computer according to one embodiment of the invention.

The following describes a system of warning messages and software and hardware lockouts for a handheld computer with a low battery charge. FIG. 2 illustrates a control flow diagram of the steps performed by the subsystem 140 in an embodiment.

The warning system shown in FIG. 2 starts with a handheld computer 100 in a normal operational state 200, with fully charged ($V=V_0$) energy supply such as a lithium ion battery with maximum voltage of 4.1 volts ($V_0$). A first warning 210 is provided when the battery has discharged to a predetermined level ($V_1$). In some embodiments, the first warning 210 is in the form of a visible message displayed on the display screen. In one embodiment, the handheld computer may be operable for several weeks before the first warning 210 occurs. Based on a normal usage pattern of twenty minutes per day, an embodiment of the handheld computer operates in a normal mode for approximately 3 weeks at about 25° C. For some embodiments of a handheld computer using a lithium-ion battery 130, the first warning voltage ($V_1$) is set at approximately 3.76 volts and occurs at a time $t_0$. The difference between the fully charged battery voltage $V_0$ and the first warning voltage 310 ($V_1$) is approximately 0.35 volts, and is referred to $V_A$. The first warning 210 is emitted as specified intervals until the time specified for the second warning 220 has elapsed. In some embodiments of a handheld computer, the first warning 210 is emitted every 5.5 minutes.

The first warning 210 also starts at least one timer and provides a second warning 220 after a predetermined time interval. The second warning 220 is provided when the measured time approximately equals a predetermined time and no voltage measurement is used to calculate when the second warning is given. In some embodiments, the second warning is in the form of a visible message displayed on the display screen. For some handheld computer embodiments, the second warning 220 is triggered by a time corresponding to either three elapsed days ($t_1$) after the first message 210, or sixty minutes of operating time ($t_2$) under normal usage after the first message 210 occurs, whichever ($t_1$ or $t_2$) happens first. In some embodiments of a handheld computer, the second warning 220 message may include for example "your batteries are extremely low" repeated every 3 minutes. The second warning 220 is based on time and usage factors instead of a voltage value. This guarantees that the second warning 220 will appear before the sleep mode 230 which occurs in some embodiments at a voltage $V_2$ on or about 0.05 volts lower than $V_1$. The time-based warning system is used because resolving voltage measurements with an A/D converter within a range of 0.05 volts is subject to inaccuracies.

In some embodiments, after the first warning message, the residual energy manager module 114 monitors whether the battery module 130 has been recharged to a predetermined reset voltage ($V_R$) greater than the first warning message voltage ($V_1$). Including a predetermined reset voltage (VR) recharge level and appropriate code in the residual energy manager module 114 can make this determination 260. If the battery module 130 has been recharged to a voltage level greater than the predetermined reset voltage ($V_R$), the operation of the handheld computer 100 continues by resetting the timer 270 for the second warning message. Otherwise, the timers continue as if no recharging has occurred.

The process continues by providing a sleep mode 230 when the battery module 130 has discharged to a predetermined voltage $V_2$. The sleep mode, discussed in greater detail in the next section D, causes the handheld computer 100 to power off and enter a shutdown state. The processor 104 transitions from a clock running state 200 to a shutdown state 230 when processor 104 receives a shutdown signal. During a sleep mode 230, the processor 104 is in an energy-conserving state and interrupts to activate certain applications and devices are masked. In the shutdown state, devices (such as a keyboard) for inputting interrupts to signal the processor 104 to power up devices remain active.

If a signal to power on a handheld computer 100 in a shutdown state is received from an input device, the processor 104 operates the residual energy manager module 114 to initially determine the presence of a shutdown state and checks the residual battery power. If the residual battery voltage is greater than a predetermined reset voltage $V_R$, the handheld computer is returned to a normal operational mode. In some embodiments of a handheld computer, the predetermined reset voltage ($V_R$) is set at about 3.81 volts, or at 0.10 volts higher than the sleep mode voltage ($V_2$) of about 3.71 volts.

Because many battery technologies, especially those involving rechargeable batteries, have a flat discharge curve, wherein the battery module delivers a large portion of its energy within a narrow voltage range and both $V_1$ and $V_2$ occur within this range, their measurement is subject to inaccuracies. Therefore, measurements of the voltage levels for the first warning message ($V_1$) and the sleep mode ($V_2$) is provided by the digital-to-analog (A/D) converter 132 to the residual energy control module 114. In some embodiments, the A/D converter 132 provides a digital value representing the battery module 130 voltage to the residual energy manager module 114. The digital value from the A/D converter 132 can be used to overcome voltage resolution limitations characteristic of the voltage comparator 134. In some embodiments, the range of battery module 130 voltage from fully charged to totally discharged is provided by the A/D converter 132 on a scale of 0 through 255.

When the battery module 130 voltage level ($V_3$) decreases to a predetermined hardware lockout voltage level ($V_L$), some embodiments of the handheld computer can implement a hardware lockout 240. The predetermined hardware lockout voltage ($V_L$) can be calculated to ensure that sufficient residual energy remains in the battery module 130 to retain data stored in the memory 110 for a period of time between battery charging opportunities. In some embodiments, the hardware lockout voltage ($V_3$) occurs at 3.5 volts and affords the user a period of 2–3 days to replenish the battery module 130 or begin to lose data. A voltage comparator 134 may determine the hardware lockout voltage ($V_3$) by comparison with a preset voltage level ($V_L$).

In other embodiments, various combinations of one or more of the warning steps 210 and 220, and the hardware lockout step 240 are included with the sleep mode provision 230. Details of the warning message system and the hardware lockout system are provided in application Ser. No. 09/321,686, entitled "Method and Apparatus for Using Residual Energy in a Battery-Powered Computer," by Osborn, et al. which is incorporated herein by reference as if set forth in its entirety.

D. Operation of the Sleep mode Program

Figure 4:
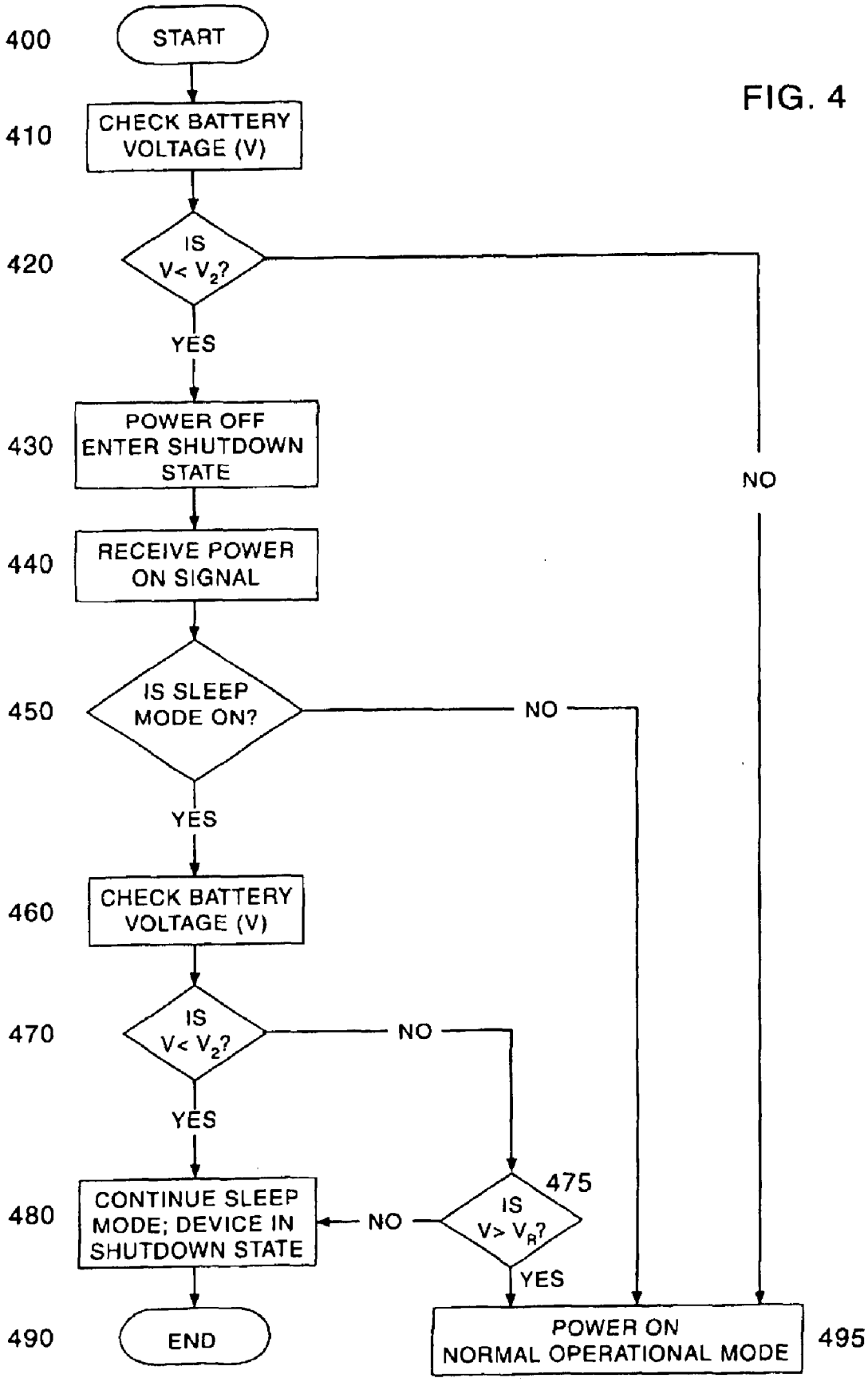
FIG. 4 is a control flow diagram for implementing a software-based shutdown in a handheld computer with low residual battery power, according to an embodiment of the invention.

The following describes a method for operating a sleep mode system when the battery module has discharged to a predetermined level. FIG. 4 illustrates a control flow diagram of the steps performed by the subsystem 140 of a preferred embodiment.

With a fully charged energy source (battery) 130, the handheld computer 100 operates in a normal mode and all energy-consuming applications and devices are responsive to interrupt signals. The A/D converter 132 periodically monitors the charge on the battery module 130 and provides the residual energy manager module 114 with a digitized reading of the voltage level (V) of the battery module 130

(block 410). The residual energy manager module 114 compares the voltage level (V) of the battery module 130 provided by the A/D converter 132 with predetermined voltage levels stored in the memory 110 corresponding to warning messages and device lockouts (block 420).

When the voltage level (V) reaches a predetermined level ($V_2$) corresponding to a sleep mode, the processor 104 operates the residual energy manager module 114 to initiate a sleep mode (block 430). In the sleep mode, the processor 104 is kept at a shutdown state in which the execution of any command is inhibited so that the consumed power of the processor 104 can be reduced. The shutdown state bus cycle let any other devices (e.g., chip set or other processors) that are coupled to processor 104 know that processor 104 is in a power down mode but is still able to respond to some events, including interrupts and reset. In an embodiment, the sleep mode occurs at the predetermined level ($V_2$) of about 3.71 volts.

In one embodiment, a transient warning message is communicated to the user when the sleep mode is being set. This occurs while the user is using the handheld computer in order to ensure that the user is not given the impression that the handheld computer is malfunctioning, but rather that it is entering a sleep mode. The warning may be audible or visible. An audible message may be in the form of a beep or a synthesized voice message. A visible warning may be temporarily displayed in the form of a message on the display device or displayed as a flashing light.

The handheld computer 100 enters the shutdown state by powering off and causing all energy-consuming peripherals to become unresponsive to the user. The low energy-consumption shutdown state of the handheld computer 100 is maintained by the interrupt controller 106 which masks interrupt signals for activating certain high-energy functions including powering a display device, performing radio frequency wireless communications and synchronizing data through modem, RS-232 communication port, or infrared (IR) port.

An interrupt to power up the handheld computer 100 during the shutdown state, causes the processor 104 to operate the sleep mode software 116 to first determine whether a sleep mode has been initiated and if so, to check the voltage level (V) of the battery module 130 provided by the A/D converter 132 and compare with a predetermined reset voltage level ($V_R$). If $V<V_R$, then the sleep mode software 116 is operated to resume the shutdown state. The processor 104 is powered down, all peripherals are low power but the keyboard and the power button remain active.

Unlike a lockout state, the interrupt controller 106 in a sleep mode is not operated to mask all interrupt signals from the power button, application buttons or connected accessories to the handheld computer 100. Only those interrupt signals are masked which operate to activate applications or devices that respond to the user, such as the display device or a communication device. Thus, the processor 104 (block 440) receives any interrupt signal entered by the user to power up the handheld computer 100. The processor 104 then operates the sleep mode software 116 to determine whether the handheld computer 100 is operating under a sleep mode (block 450). If the sleep mode is not operative at the time the interrupt signal to turn power on is received, the handheld computer 100 responds by powering on to a normal operational mode (block 495).

However, if the sleep mode is operative at the time the interrupt signal to turn on power is received, the processor 104 operates the residual energy manager module 114 to check the battery voltage (block 460). If the battery module has been sufficiently recharged in the interim to a voltage above a predetermined reset level ($V_R$) 475, the processor 104 reconfigures the interrupt controller 106 to end the shutdown state of the handheld computer 100 and allow the handheld computer 100 to operate in a normal energy-consumption mode (block 495). In an embodiment of a handheld computer, the sleep mode ceases to operate at a battery voltage above the predetermined reset level ($V_R$) of 3.81 volts.

If the battery module has not been recharged to the predetermined reset level ($V_R$), the sleep mode remains operational and the handheld computer 100 remains in the low energy-consumption shutdown state (block 480). The processor 104 responds to the signal to power up the handheld computer 100 by operating the interrupt controller 106 to mask the interrupts which operates applications and devices which provide feedback to the user that the handheld computer has been turned on.

E. Alternative Embodiments

Specific embodiments of the invention are further described in the following examples which illustrate various significant features.

Figure 3:
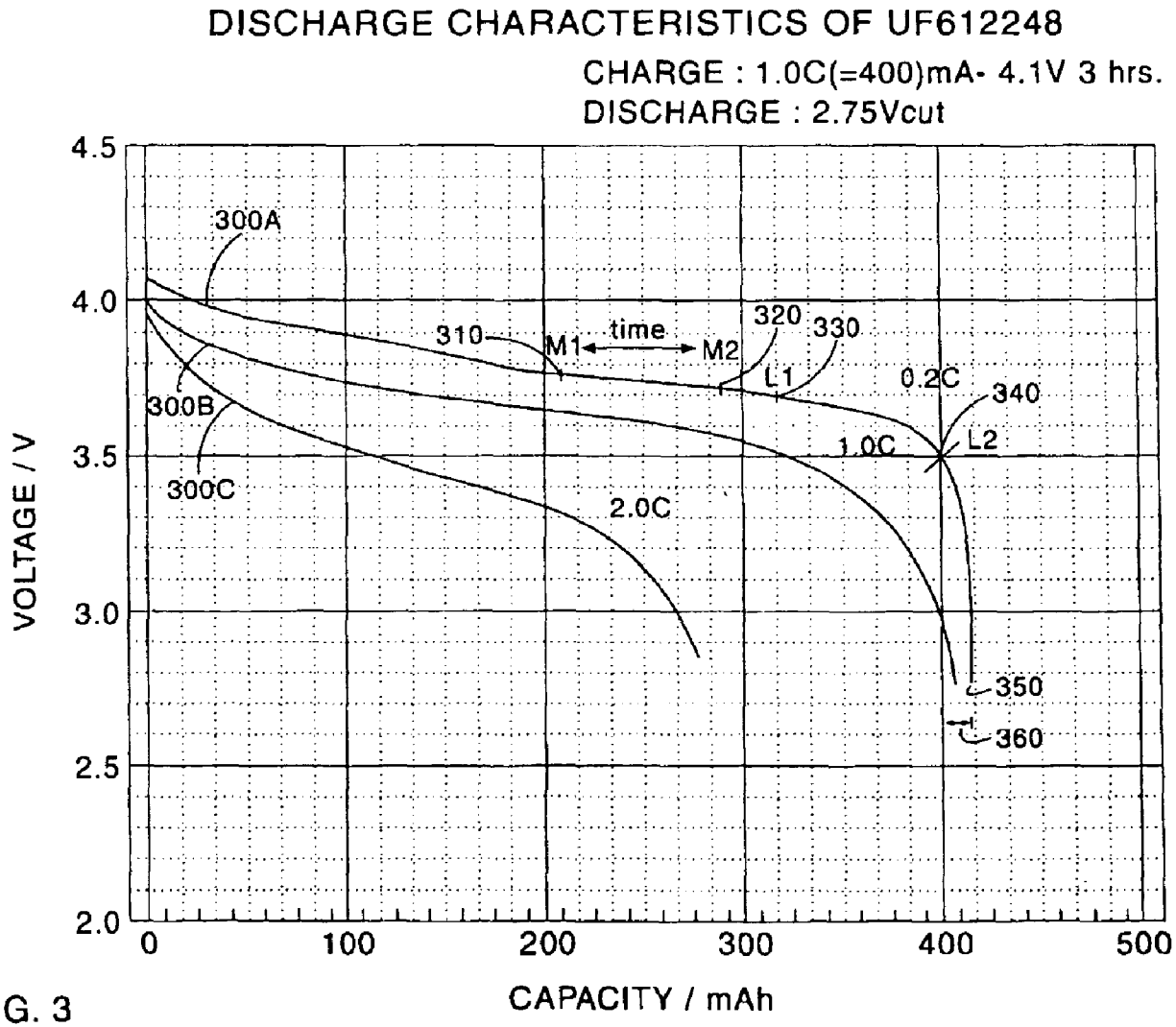
FIG. 3 illustrates a battery discharge curve for a handheld computer, according to an embodiment of the invention.

One example of a battery-powered handheld computer 100 according to some embodiments of the invention uses a lithium-ion battery having discharge properties illustrated by the discharge cycles in FIG. 3. The battery module 130 represented in FIG. 3 may be, for example, a UF612248 lithium-ion battery from SANYO Energy (U.S.A.) Corporation, San Diego, Calif., which has a rated capacity (1.0 C) of approximately 400 milliamp-hours for an initial charge of 4.1 volts.

FIG. 3 shows a first discharge cycle curve 300A for a lightly-loaded battery module 130 where the discharge rate is approximately 80 milliamperes (mA). Energy efficient portable computers have battery module 130 discharge rates similar to 80 mA (0.2 C, or one-fifth of the 1.0 C rated capacity) as represented in the first discharge cycle curve 300A. A second discharge cycle curve 300B, shown in FIG. 3 for comparison purposes only, represents the curve for a moderately-loaded lithium-ion battery 130, e.g., 400 mA discharge rate. The third discharge cycle curve 300C represents a heavily loaded lithium-ion battery 130, e.g., 800 mA discharge rate. The voltages for the various message and lockout levels for this first example are based on an estimate of 300 microamperes for the current used by the battery-powered handheld computer 100 in standby mode, and an estimated 12 milliamperes of active use current. The message and lockout levels values, indicated on FIG. 3, are also based on an average of twenty minutes of active use time per day. Based on these estimates, the battery-powered computer 100 consumes approximately 12 milliamp-hours per day during normal operation.

In some embodiments, the battery-powered computer 100 provides a first warning when the battery module 130 discharges to a first warning (M1) voltage 310. For some embodiments of a portable computer using a lithium-ion type battery, the M1 voltage 310 ($V_1$) is set at approximately 3.76 volts and occurs at a time $t_0$. For example, a Palm V™ connected organizer can be used for approximately 21 days at 25° C. from the M1 warning occurs. The twenty-one day period is based on the battery discharge curve for the lithium-ion battery 130, and a normal usage pattern of twenty minutes per day and on the assumption that the battery 130 is fully charged to approximately 4.1 volts ($V_0$)

at the beginning of the 21-day period. The difference between the fully charged battery 130 voltage $V_0$ and the M1 voltage 310 ($V_1$) is approximately 0.35 volts, and is referred to as $V_A$ in FIG. 2.

In some embodiments, the A/D converter 132 provides a digital value representing the battery module 130 voltage to the residual energy manager module 114. The digital value from the A/D converter 132 can be used to overcome voltage resolution limitations characteristic of the voltage comparator 134.

The residual energy manager module 114 can store the M1 voltage 310. In response to receiving a digital value representing a voltage approximately equal to the M1 voltage 310 from the A/D converter 132 during discharge of the battery module 130, the residual energy manager module 114 can cause the display of a first warning message on the image screen of the battery-powered computer 100. For certain handheld computer embodiments, the first warning includes a warning that "your batteries are low". The first warning can also inform the user that placing the handheld computer into a communications cradle will recharge the battery module 130.

For some embodiments, the battery-powered computer 100 provides a second warning (M2) 320 message that occurs at an M2 time 320 corresponding to a predetermined measure of time after the first warning (M1) message occurs. For some embodiments, the M2 message is triggered by an M2 time 320 corresponding to either three elapsed days after M1 occurs ($t_1$), or sixty minutes of operating time assuming normal usage after M1 occurs ($t_2$), whichever occurs first. M2 is based on time and usage factors instead of a voltage value because of the difficulty in resolving differences of less than 0.05 volts, needed to guarantee that the M2 warning will appear before the sleep mode L1. For some embodiments, the M2 message includes "your batteries are extremely low".

A first timer for the second warning can be disposed in the warning level calculation circuit 124 and controlled by the residual energy manager module 114 to track the elapsed time after the M1 warning. A second timer, also disposed in the warning level calculation circuit 124 and controlled by the residual energy manager module 114, can track the battery-powered computer 100 operation time after the M1 warning. The second timer can be adapted to ensure that a light or heavy user will see the second M2 warning at an appropriate M2 time 320 after the first (M1) warning, but before the battery-powered computer 100 locks out.

For example, if the battery-powered computer 100 is used for high-energy consumption functions after the M1 warning, the operating time before the second (M2) warning is displayed is reduced by an appropriate amount. The reduction in operating time before the M2 warning occurs can be accomplished by accelerating the second timer during operation of high-energy consumption functions. In some embodiments, the high-energy functions can include use of a backlight to enhance the display, RS-232 data synchronization, infrared data synchronization, and wireless communication.

The residual energy manager module 114 can cause the first and second timers to be reset to zero in response to the processor 104 detecting that the battery module 130 is being charged after the user sees the M1 message, but before M2. For a handheld computer, such as a Palm V™ connected organizer, a communication cradle for synchronizing data, such as a HotSync™ communication cradle, can also recharge the battery module 130.

One embodiment of the invention can detect whether the battery-powered computer 100 is connected to the communication cradle as described by U.S. patent application Ser. No. 09/299,063, entitled "Detection of an Accessory Device Connected to a Portable Computer," filed, Apr. 23, 1999 which is incorporated herein by reference. The residual energy manager module 114 can respond to the detection of the connection to the communication cradle by implementing a timer reset function that monitors the battery module 130 operating voltage to determine whether the voltage has been charged above a timer reset voltage level as described in the next two paragraphs.

In some embodiments, the processor 104 can respond to an A/D converter 132 digital value indicating that the battery module 130 voltage has been charged higher than the M1 voltage by a threshold amount by canceling the timers. For example, given an M1 voltage 310 of 3.76 volts, a timer-reset voltage of 3.81 volts can be used by the residual energy manager module 114 to cancel the timers.

The M2 voltage can be approximately in the range of 3.73 to 3.74 volts. Recharge of the battery module 130 from the M2 voltage to the initial operating voltage of 4.1 volts in embodiments using a lithium-ion battery can take approximately thirty minutes.

The margin of 0.05 volts (or 50 millivolts) used to ensure that the timer-reset voltage is readily distinguished from the M1 voltage 310. This margin is preferred even for properly calibrated A/D converters 132 in order to avoid resetting the timers when the operating voltage has not actually recharged to the M1 voltage 310.

In some embodiments of the battery-powered computer 100, the accuracy of the digital signal provided by the A/D converter 132 can be improved from approximately 100 millivolts to approximately 50 millivolts by calibrating the A/D converter 132. The temperature and the A/D converter 132 accuracy can force the voltage readings provided to the processor 104 and the residual energy manager module 114 up or down the time scale.

Even with calibration, certain factors contribute to variability (or uncertainty) in the values provided by the A/D converter 132 and can be accounted for such that the messages 210 and 220, sleep mode 230 and lockout 240 meet user expectations. For example, drift can provide an uncertainty of approximately 3 millivolts in some embodiments, A/D converter 132 leakage (on or about 15 millivolts), long term stability (on or about 2.5 millivolts), and FET temperature drift (on or about 5 millivolts). These contribute to a total uncertainty range of approximately ±25.5 millivolts if the A/D converter 132 is calibrated using an In-Circuit Tester (ICT).

Further, even an accurate battery module 130 voltage measurement is not necessarily an accurate indicator of remaining battery capacity because many battery technologies, especially rechargeable batteries, have a "flat" discharge curve wherein the battery module delivers a large portion of the battery's energy at approximately the same voltage. As mentioned above, M2 is based on time and usage factors instead of a voltage value because of the difficulty in resolving 0.05 volts by the A/D converter 132.

The residual energy manager module 114 can store the timer reset voltage level (e.g., 3.81 volts), and code to provide a signal to the processor 104 to reset the first and second timers upon receiving a value from the A/D converter 132 corresponding approximately to the reset voltage level.

In some embodiments, the processor 104 includes an interrupt controller 106. The interrupt controller 106 can be programmed to mask off signals from signal producing components such as power-up buttons, wireless communication antennas, application buttons, connected accessory devices (such as synchronization docking ports and modems), and other components that would otherwise begin energy-consuming processing in the battery-powered computer 100.

In some embodiments, a sleep mode (L1) occurs at an L1 voltage ($V_2$) 330 of approximately 3.71 volts. The difference between the fully charged battery module 130 voltage and the L1 voltage ($V_2$) 330 is approximately 0.39 volts, and is referred to as $V_B$ in FIG. 2.

According to battery module 130 discharge data at 25° C. and 20% of the discharge rate at which the battery module capacity is specified, discharge to a battery voltage of approximately 3.71 volts, e.g., the sleep mode voltage, occurs approximately 2 days after the second warning (M2) message for an average user. Discharge to the L1 voltage 330 also occurs approximately 7 to 10 days before the battery module 130 discharges to the cutoff voltage (2.75 volts) 350 when the average handheld computer begins to lose data.

In some embodiments, the residual energy manager module 114 reconfigures the interrupt controller 106 when the battery module 130 discharges to the L1 voltage 330. The reconfiguration causes the processor 104 to respond to interrupt signals from the power button, or application buttons signaling the device to turn the power on, by operating a sleep mode software 116. The sleep mode software 116 operates to maintain the handheld computer 100 in a shutdown state. In the shutdown state, the processor 104 responds to a power on interrupt signal by operating the sleep mode software 116. The sleep mode software 116 tests to see if the handheld computer 100 is in a shutdown state and upon confirming the operation of a sleep mode, causes the A/D converter 132 to test the voltage level of the battery module 130. In some embodiments, the voltage level below a predetermined reset level ($V_R$) returns the handheld computer 100 to a shutdown state. In the shutdown state, the power button and the keyboard of the handheld computer 100 remain active to receive signals for powering up the device but the interrupt controller 106 masks interrupt signals to operate applications or devices thus by providing the user with no feedback.

In some embodiments, operation of the sleep mode software 116 requires the processor 104 to remain on for on or about 100 milliseconds which is the time required to determine the presence of a sleep mode and read the output from the A/D converter 132. When the handheld computer 100 plays "dead" in a shutdown state, devices such as the liquid crystal display screen do not power up. The user is provided no feedback and is discouraged from holding down the power button, which protects the battery module 130 from further discharge.

The M1, L1, and L2 voltage levels (310, 330 and 340) can be based on providing approximately three days between M1 and M2, and two days between M2 and sleep mode L1. The estimated duration between sleep mode L1 and cutoff, e.g., loss of battery life when contents of memory 110 begin to be lost, is approximately seven days. Sleep mode L1 accounts for approximately five of those days before a hardware lockout L2 and approximately two days are provided from the hardware lockout L2 to the battery cutoff voltage 350. The hardware lockout L2 can force the processor 104 to get an interrupt, and lock all the power and application switches.

In order to have seven days after L1 before cutoff, the residual energy is approximately 50 mAh (7.2 mAh/day discharge for standby mode multiplied by seven days). Battery module 130 voltage measurements for a handheld computer using a lithium-ion battery with the discharge characteristics shown in FIG. 3 reveal that a target of seven days between the sleep mode L1 and when the battery module discharges to the 2.5 volts cutoff voltage 350 can be provided, by setting the L1 voltage at 3.71 volts.

For handheld computers using a lithium-ion battery 130 having the discharge characteristics shown in FIG. 3, the hardware lockout (L2) occurs at a voltage of approximately 3.5 volts. In response to the voltage comparator 134 providing a voltage level approximately equal to the L2 voltage 340, the processor 104 receives a lockout interrupt signal and responds by locking out all power, application and connected device interrupt signals. The L2 voltage 340 is estimated to provide a period in which the data stored in the memory 110 can be retained before the battery module 130 discharges to the cutoff voltage 350 of approximately two days. When the battery module 130 discharges to the, the battery-powered computer 100 shuts off, and the user loses volatile data stored in the memory 110. The battery module 130 should be recharged before the cutoff voltage 350 is reached.

The L2 to cutoff voltage difference is approximately 0.75 volts for some embodiments of the handheld computer, as illustrated by the first discharge cycle curve 300A. L1 and L2 can move relative to each other depending on temperature and component tolerances. In some embodiments, a thermal sensor is included to set L1 and L2 such that the user's data is protected for at least 7 days after the sleep mode voltage (L1) is reached. The thermal sensor measures the ambient temperature of operation of the handheld computer and communicates to a coupled residual energy management module 114, which, in turn, resets the sleep mode voltage (L1).

The hardware lockout (L2) can be implemented using hardware resources as discussed in application Ser. No. 09/321,686, entitled "Method and Apparatus for Using Residual Energy in a Battery-Powered Computer," by Osborn, et al. which is incorporated herein by reference.

Using hardware to lockout the application, power and connected device interrupt signals ensures that the lockout will occur, and the residual battery capacity reserved, even if there is a software failure. Such software failures can occur for L1, M1 and M2 and other software driven events because of program crashes or other defects.

F. Conclusion

In some embodiments of the invention, a sleep mode is initiated when the energy source of a handheld computer has discharged to a predetermined low level. In this shutdown state, interrupt signals to activate high-energy consuming peripherals are masked but the handheld computer remains responsive to signals to turn power on. A handheld computer under a sleep mode responds to signals to turn on energy consuming peripherals by first determining whether the energy source has been sufficiently recharged to exit the shutdown state induced by the sleep mode. If the battery module has been sufficiently recharged the handheld computer returns to the normal operational mode, otherwise it remains in the shutdown state and continues to mask interrupt signals that activate high-energy consuming applications and devices.

The foregoing descriptions of various embodiments of the invention have been presented for purposes of illustration and description. It is not intended to limit the invention to the precise forms disclosed. Many modifications and equivalent arrangements will be apparent.

What is claimed is:

1. A method for managing power in a [handheld computer] *handheld electronic device with one or more processors*, the [handheld computer] *handheld electronic device* having a sleep mode setting and comprising a battery, at least one input device for turning the [handheld computer] *handheld electronic device* on, and at least one device for detecting a battery power level, the method comprising:

receiving an input signal to turn the [handheld computer] *handheld electronic device* on;

determining whether the [handheld computer] *handheld electronic device* is in the sleep mode;

accessing the device for detecting the battery power level if the [handheld computer] *handheld electronic device* is in the sleep mode;

responsive to detecting the battery power level, comparing the detected battery power level to a first predetermined power level that is selected from a group of power levels consisting of (i) a power level that occurs on or about one week prior to the [handheld computer] *handheld electronic device* losing data stored in a memory of the [handheld computer] *handheld electronic device*, (ii) a power level that is based on measuring an ambient temperature of the [handheld computer] *handheld electronic device*, and (iii) a power level that is based on about 3.71 volts; and maintaining the [handheld computer] *handheld electronic device* in the sleep mode if the detected battery power level is less than the first predetermined power level.

2. The method of claim 1, wherein accessing the device for detecting the battery power level is carried out by an analog-to-digital converter device.

3. The method of claim 1, wherein maintaining the sleep mode comprises:

receiving an input signal for turning on power in the [handheld computer] *handheld electronic device*;

responding to the input signal by determining whether the [handheld computer] *handheld electronic device* is in a sleep mode; and responsive to determining that the [handheld computer] *handheld electronic device* is in a sleep mode, masking interrupt signals for powering one or more applications and devices of the [handheld computer] *handheld electronic device*.

4. The method of claim 3, wherein:

masking interrupt signals for powering the one or more applications and devices of the [handheld computer] *handheld electronic device* includes masking interrupt signals for powering one or more applications and devices which provide a feedback to the user that the [handheld computer] *handheld electronic device* is operational.

5. The method of claim 4, wherein masking interrupt signals for powering the one or more applications and devices which provide a feedback to the user that the [handheld computer] *handheld electronic device* is operational includes masking interrupt signals for powering a display device.

6. The method of claim 4, wherein masking interrupt signals for powering the one or more applications and devices which provide a feedback to the user that the [handheld computer] *handheld electronic device* is operational includes masking interrupt signals for powering a communications device.

7. A method for managing power in a [handheld computer] *handheld electronic device with one or more processors* having a sleep mode setting, the [handheld computer] *handheld electronic device* comprising a battery, at least one input device for turning the [handheld computer] *handheld electronic device* on, and at least one device for detecting a battery power level, the method comprising:

replenishing the primary energy source;

receiving an input signal to turn the [handheld computer] *handheld electronic device* on;

determining whether the [handheld computer] *handheld electronic device* is in the sleep mode;

accessing the device for detecting the battery power level if the [handheld computer] *handheld electronic device* is in the sleep mode;

responsive to detecting the battery power level, comparing the detected battery power level to a first predetermined power level;

comparing the detected battery power level to a second predetermined power level if the detected battery power level is greater than the first predetermined power level; and exiting the sleep mode when the detected battery power level is greater than the second predetermined power level.

8. The method of claim 7, wherein the battery of the [handheld computer] *handheld electronic device* is a rechargeable battery, replenishing the primary energy source comprising:

recharging the rechargeable battery.

9. The method of claim 7, wherein the battery of the [handheld computer] *handheld electronic device* is a non-rechargeable battery, replenishing the primary energy source comprising:

replacing the non-rechargeable battery.

10. The method of claim 7, wherein the exiting the sleep mode occurs when the detected battery power level is greater than a second predetermined voltage of on or about 0.10 volts higher than the first predetermined voltage.

11. The method of claim 7, wherein the exiting the sleep mode occurs when the detected battery power level is greater than a second predetermined voltage of on or about 3.81 volts.

12. An apparatus for reserving power in a [handheld computer] *handheld electronic device with one or more processors*, the [handheld computer] *handheld electronic device* having a sleep mode setting, a battery as a primary energy source, at least one input device for turning on power, and at least one device for detecting a battery power level, the [handheld computer] *handheld electronic device* including a subsystem, wherein the subsystem comprises a processor coupled to a interrupt controller and a memory controller, the interrupt controller coupled to a memory, the memory including a sleep mode software and a residual energy manager module, and wherein the subsystem is coupled to the device for detecting a battery power level, the apparatus comprising:

responsive to receiving an input signal to turn device power on, means for accessing the sleep mode setting;

responsive to determining that the [handheld computer] *handheld electronic device* is in the sleep mode, means for accessing the device for detecting the battery power level; and responsive to the detected battery power level, means for maintaining the sleep mode or exiting the sleep mode;

responsive to detecting a battery power level, means *for* comparing the detected battery power level to a first predetermined power level; and responsive to determining the detected battery power level is less than the first predetermined power level, means for maintaining the [handheld computer] *handheld electronic device* in the sleep mode;

wherein the first predetermined power level is set at a level which provides on or about seven days of a normal usage of the [handheld computer] *handheld electronic device* prior to the [handheld computer] *handheld electronic device* losing data stored in a memory of the [handheld computer] *handheld electronic device*.

13. The apparatus of claim 12, wherein:

the device for detecting the battery power level includes an analog-to-digital converter.

14. The apparatus of claim 12, further comprising:

responsive to receiving an input signal for turning on power in the [handheld computer] *handheld electronic device*, means for determining whether the [handheld computer] *handheld electronic device* is in a sleep mode; and responsive to determining that the [handheld computer] *handheld electronic device* is in a sleep mode, means for operating the interrupt controller to mask interrupt signals for powering one or more applications and devices of the [handheld computer] *handheld electronic device*.

15. The apparatus of claim 14, wherein the one or more applications and devices of the [handheld computer] *handheld electronic device* includes an application or device which provides a feedback to the user that the [handheld computer] *handheld electronic device* is operational.

16. The apparatus of claim 15, wherein the one or more applications and devices of the [handheld computer] *handheld electronic device* includes a display device.

17. The apparatus of claim 15, wherein the one or more applications and devices of the [handheld computer] *handheld electronic device* includes a communications device.

18. An apparatus for reserving power in a [handheld computer] *handheld electronic device with one or more processors*, the [handheld computer] *handheld electronic device* having a sleep mode setting, a battery as a primary energy source, at least one input device for turning on power, and at least one device for detecting a battery power level, the [handheld computer] *handheld electronic device* including a subsystem, wherein the subsystem comprises a processor coupled to a interrupt controller and a memory controller, the interrupt controller coupled to a memory, the memory including a sleep mode software and a residual energy manager module, and wherein the subsystem is coupled to the device for detecting a battery power level, the apparatus comprising:

responsive to receiving an input signal to turn device power on, means for accessing the sleep mode setting;

responsive to determining that the [handheld computer] *handheld electronic device* is in the sleep mode, means for accessing the device for detecting the battery power level; and responsive to the detected battery power level, means for maintaining the sleep mode or exiting the sleep mode;

responsive to detecting a battery power level, means *for* comparing the detected battery power level to a first predetermined power level; and responsive to determining the detected battery power level is less than the first predetermined power level, means for maintaining the [handheld computer] *handheld electronic device* in the sleep mode;

a thermal sensor; and means for setting the first predetermined power level based on the thermal sensor detecting an ambient temperature of the [handheld computer] *handheld electronic device*.

19. The apparatus of claim 18, wherein:

the device for detecting the battery power level includes an analog-to-digital converter.

20. The apparatus of claim 18, further comprising:

responsive to receiving an input signal for turning on power in the [handheld computer] *handheld electronic device*, means for determining whether the [handheld computer] *handheld electronic device* is in a sleep mode; and responsive to determining that the [handheld computer] *handheld electronic device* is in a sleep mode, means for operating the interrupt controller to mask interrupt signals for powering one or more applications and devices of the [handheld computer] *handheld electronic device*.

21. The apparatus of claim 20, wherein the one or more applications and devices of the [handheld computer] *handheld electronic device* includes an application or device which provides a feedback to the user that the [handheld computer] *handheld electronic device* is operational.

22. The apparatus of claim 21, wherein the one or more applications and devices of the [handheld computer] *handheld electronic device* includes a display device.

23. The apparatus of claim 21, wherein the one or more applications and devices of the [handheld computer] *handheld electronic device* includes a communications device.

24. An apparatus for reserving power in a [handheld computer] *handheld electronic device with one or more processors*, the [handheld computer] *handheld electronic device* having a sleep mode setting, a battery as a primary energy source, at least one input device for turning on power, and at least one device for detecting a battery power level, the [handheld computer] *handheld electronic device* including a subsystem, wherein the subsystem comprises a processor coupled to a interrupt controller and a memory controller, the interrupt controller coupled to a memory, the memory including a sleep mode software and a residual energy manager module, and wherein the subsystem is coupled to the device for detecting a battery power level, the apparatus comprising:

responsive to receiving an input signal to turn device power on, means for accessing the sleep mode setting;

responsive to determining that the [handheld computer] *handheld electronic device* is in the sleep mode, means for accessing the device for detecting the battery power level; and responsive to the detected battery power level, means for maintaining the sleep mode or exiting the sleep mode;

responsive to detecting a battery power level, means *for* comparing the detected battery power level to a first predetermined power level; and responsive to determining the detected battery power level is less than the first predetermined power level, means for maintaining the [handheld computer] *handheld electronic device* in the sleep mode;

wherein the first predetermined power level is on or about 3.71 volts.

25. The apparatus of claim 24, wherein:

the device for detecting the battery power level includes an analog-to-digital converter.

26. The apparatus of claim 24, further comprising:

responsive to receiving an input signal for turning on power in the [handheld computer] *handheld electronic device*, means for determining whether the [handheld computer] *handheld electronic device* is in a sleep mode; and responsive to determining that the [handheld computer] *handheld electronic device* is in sleep mode, means for operating the interrupt controller to mask interrupt signals for powering one or more applications and devices of the [handheld computer] *handheld electronic device*.

27. The apparatus of claim 26, wherein the one or more applications and devices of the [handheld computer] *handheld electronic device* includes an application or device which provides a feedback to the user that the [handheld computer] *handheld electronic device* is operational.

28. The apparatus of claim 27, wherein the one or more applications and devices of the [handheld computer] *handheld electronic device* includes a display device.

29. The apparatus of claim 27, wherein the one or more applications and devices of the [handheld computer] *handheld electronic device* includes a communications device.

*30. An article comprising a machine-readable storage medium containing instructions that if executed enable a system to manage power in a handheld electronic device with one or more processors, the handheld electronic device having a sleep mode setting and comprising a battery, at least one input device for turning the handheld electronic device on, and at least one device for detecting a battery power level, the instructions that if executed enable the system to: receive an input signal to turn the handheld electronic device on; determine whether the handheld electronic device is in the sleep mode; access the device for detecting the battery power level if the handheld electronic device is in the sleep mode; responsive to detecting the battery power level, compare the detected battery power level to a first predetermined power level that is selected from a group of power levels consisting of (i) a power level that occurs on or about one week prior to the handheld electronic device losing data stored in a memory of the handheld electronic device, (ii) a power level that is based on measuring an ambient temperature of the handheld electronic device, and (iii) a power level that is based on about 3.71 volts; and maintain the handheld electronic device in the sleep mode if the detected battery power level is less than the first predetermined power level.*

*31. The article of claim 30, further comprising instructions that if executed enable the system to access the device for detecting the battery power level using an analog-to-digital converter device.*

*32. The article of claim 30, further comprising instructions that if executed enable the system to maintain the sleep mode by receiving an input signal for turning on power in the handheld electronic device; responding to the input signal by determining whether the handheld electronic device is in a sleep mode; and responsive to determining that the handheld electronic device is in a sleep mode, masking interrupt signals for powering one or more applications and devices of the handheld electronic device.*

*33. The article of claim 32, further comprising instructions that if executed enable the system to mask interrupt signals for powering the one or more applications and devices of the handheld electronic device including masking interrupt signals for powering one or more applications and devices which provide a feedback to the user that the handheld electronic device is operational.*

*34. The article of claim 33, further comprising instructions that if executed enable the system to mask interrupt signals for powering the one or more applications and devices which provide a feedback to the user that the handheld electronic device is operational including masking interrupt signals for powering a display device.*

*35. The article of claim 33, further comprising instructions that if executed enable the system to mask interrupt signals for powering the one or more applications and devices which provide a feedback to the user that the handheld electronic device is operational including mask interrupt signals for powering a communications device.*

*36. An article comprising a machine-readable storage medium containing instructions that if executed enable a system to manage power in a handheld electronic device with one or more processors having a sleep mode setting, the handheld electronic device comprising a battery, at least one input device for turning the handheld electronic device on, and at least one device for detecting a battery power level, the instructions that if executed enable the system to: replenish the primary energy source; receive an input signal to turn the handheld electronic device on; determine whether the handheld electronic device is in the sleep mode; access the device for detecting the battery power level if the handheld electronic device is in the sleep mode; responsive to detecting the battery power level, compare the detected battery power level to a first predetermined power level; compare the detected battery power level to a second predetermined power level if the detected battery power level is greater than the first predetermined power level; and exit the sleep mode when the detected battery power level is greater than the second predetermined power level.*

*37. The article of claim 36, wherein the battery of the handheld electronic device is a rechargeable battery, replenishing the primary energy source comprising: recharging the rechargeable battery.*

*38. The article of claim 36, wherein the battery of the handheld electronic device is a non-rechargeable battery, replenishing the primary energy source comprising: replacing the non-rechargeable battery.*

*39. The article of claim 36, further comprising instructions that if executed enable the system to exit the sleep mode when the detected battery power level is greater than a second predetermined voltage of on or about 0.10 volts higher than the first predetermined voltage.*

*40. The article of claim 36, further comprising instructions that if executed enable the system to the exit the sleep mode when the detected battery power level is greater than a second predetermined voltage of on or about 3.81 volts.*

* * * * *